UNITED STATES PATENT OFFICE.

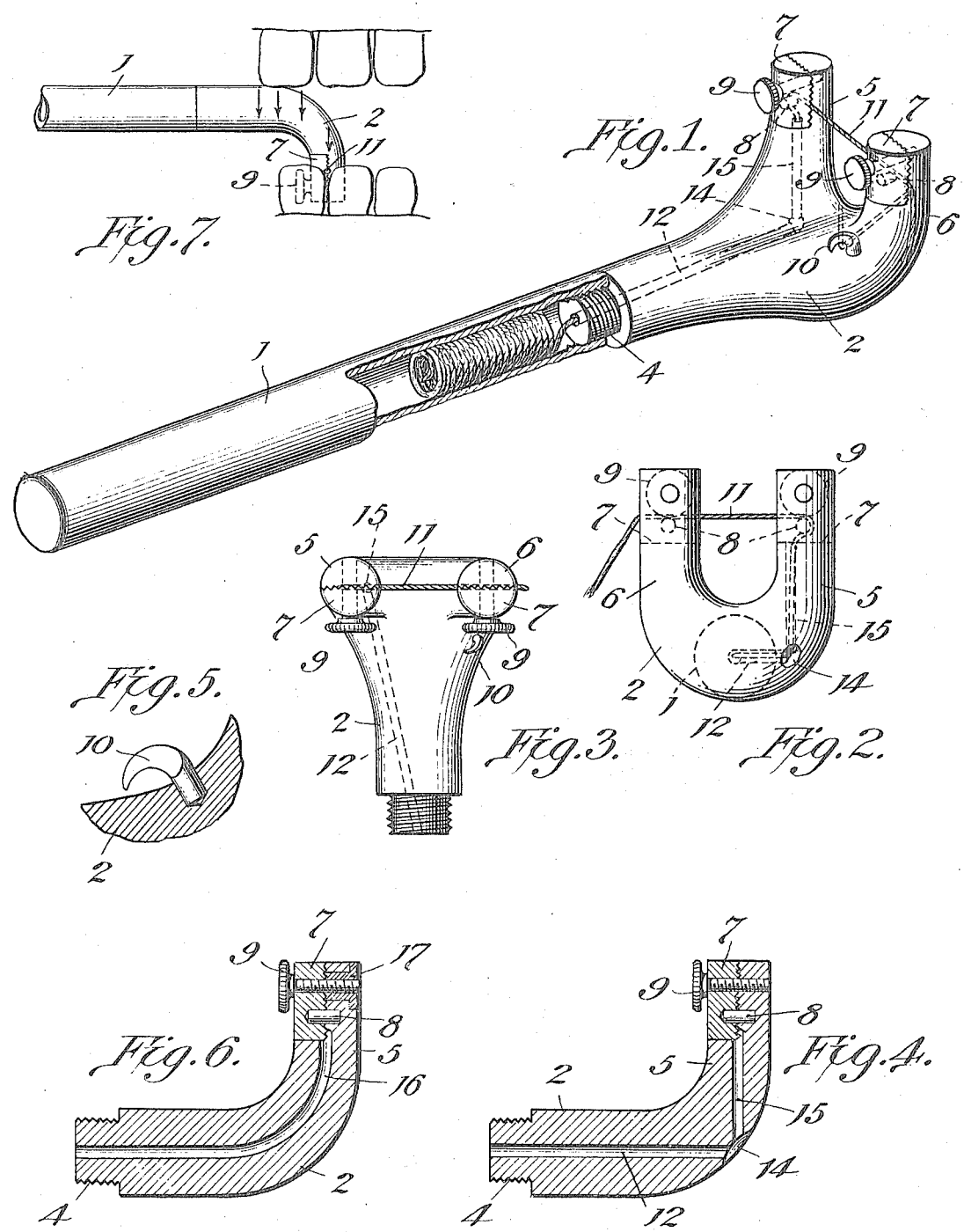

PAUL A. STUART, OF CHESWICK BOROUGH, PENNSYLVANIA.

DENTAL-FLOSS MANIPULATOR.

1,180,620.

Specification of Letters Patent.

Patented Apr. 25, 1916.

Application filed June 4, 1914. Serial No. 843,019.

*To all whom it may concern:*

Be it known that I, PAUL A. STUART, a citizen of the United States, and a resident of the borough of Cheswick, in the county of Allegheny, State of Pennsylvania, have invented certain new and useful Improvements in Dental-Floss Manipulators, of which the following is a specification.

The invention which will hereinafter be described in detail, relates broadly to the art of tooth picks or tooth-cleaners, and more particularly to an implement for holding dental floss.

The principal object of this invention is to provide a dental floss tool wherein the supply of dental floss is completely protected from contamination.

Another object of this invention is that of providing an implement for holding dental floss wherein a supply of dental floss is carried by the implement in such manner that the supply is entirely sealed and only the portion to be used is exposed.

Another object of this invention is to provide an implement carrying a supply of dental floss provided with a knife, for cutting away used portions of the floss, and arranged in such manner as to be protected by the walls of the implement so that the user of the implement is not in danger of being cut or injured by the knife.

Another object of this invention is to provide a dental floss implement comprising rigid fingers arranged at substantially right angles to the handle portion of the implement and constructed in such manner that pressure may be brought against the base of the instrument to force the dental floss between the teeth.

A still further object of the invention is to provide a dental floss finger adapted to carry a supply of dental floss within the interior of the implement and having the exterior of the implement formed with smooth surfaces to facilitate cleaning and sterilizing the implement.

Still other and further objects of this invention will in part be obvious and will in part be pointed out in the specification hereinafter following by reference to the accompanying drawings, wherein like characters are used to represent like parts throughout the several figures thereof.

Figure 1 is a perspective view showing a portion of the handle broken away to display the supply of floss. Fig. 2 is an end view of the device indicating the opening through which the supply of dental floss is fed. Fig. 3 is a view looking directly at the ends of the fingers. Fig. 4 is a sectional view taken on lines which intersect the thread supply openings where the operating head of the device is made of metal. Fig. 5 is a detail view illustrating the cutting knife. Fig. 6 is a detail sectional view taken on the line of the thread opening where the operating head is made of vulcanite or similar material. Fig. 7 is a diagrammatic view indicating one manner in which the tool may be used to force the dental floss into the crevices between the teeth.

Heretofore the customary use of dental floss has been to draw the floss between the teeth by simply holding the floss in the fingers and stretching a portion of the floss and moving it back and forth until it drops into a crevice between the teeth. This operation is awkward and it is difficult to properly reach the back teeth, which teeth are more liable to retain particles of food in the crevices between them than are the front teeth. To obviate the difficulties of cleaning the teeth with dental floss, various types of floss holders have been designed. Such devices however, either do not carry a supply of dental floss or do not properly protect the dental floss supply, if the supply is carried by the implement. It is particularly desirable that the dental floss be kept in as sanitary condition as possible. Furthermore, implements for holding dental floss while in use, heretofore, have not been designed with the operative portion of the floss held in such position that it can be readily and easily forced between the crevices of the back teeth, and it is to obviate the several difficulties hereinbefore set forth, that applicant's device is designed.

Applicant's device it will be noted, by inspecting the drawings, comprises a pair of spaced apart rigid fingers connected to a rigid handle so that the fingers extend at substantially right angles to the handle and are constructed to hold a portion of the dental floss at their outer ends so that a plane passing through the dental floss and bisecting the fingers would be at right angles to the axis of the handle. It will also be noted that the fingers and handle are substantially cylindrical and are joined by smooth flowing curved surfaces which present no corners for the accumulation of deleterious matter of any character. This enables the device to be easily cleaned and sterilized. It will further be noted that the floss is carried within the handle portion and is entirely sealed against contamination, the only part being exposed being that portion stretched between the fingers, which portion is of course intended for use. It will also be noted that the knife for severing the used portion is preferably located on a curved portion of the surface, and in its preferred form comprises a meniscus blade having the point thereof close to a surface of the device, thus obviating and preventing any possibility of the user of the device being injured by the knife.

Referring now to the drawings wherein one form of applicant's device is illustrated, the handle portion 1 is made hollow, and in its preferred form is attached to the head portion 2 by a tight fitting screw joint 4. This joint in its preferred form is made water tight. The head portion 2 is bifurcated in such manner as to form two arms 5 and 6 respectively. Each arm at its outer end is provided with a thread securing device, which in the present form is indicated as comprising clamps 7 that are seated against faces in the outer ends of the arms 5 and 6, and are secured from rotation on the faces by means of the dowel pins 8. The clamps 7 are adapted to be seated against the faces by means of small thumb screws 9, and preferably the clamping faces are serrated as shown in Fig. 1. A knife is provided for severing used portions of the dental floss, and in its preferred form comprises a meniscus blade 10 set in the curved surface between an arm and the body portion with the tip or point of the knife facing toward the handle and arranged close to the surface, as is shown in Fig. 5, the construction and arrangement of the knife, together with its location on the implement obviating any injury to the user by being cut with this knife. The hollow handle 1 comprises a container for the supply of dental floss 11, which is preferably wound hollow in such manner as to feed from the center of the supply.

For certain uses it may be desirable that the implement be entirely made of metal, and aluminum is preferable for this purpose because of its lightness and strength. Where the device is made of metal, the head portion 2 is preferably drilled to provide an opening 12 which leads from the inner end of the head portion to an opening in a small depression 14 in the outer surface thereof. A second opening or canal 15 is drilled from this depression 14 and terminates under the clamps 7 on the arm 5 in such manner that when the clamp is secured in position it substantially seals the opening water tight.

For certain purposes it may be desirable to form the head portion of the implement of vulcanite or such material, and in such cases it is preferable that the opening leading from the hollow handle to the supply arm comprises a curved channel 16, as is shown in Fig. 6. Where the device is made of vulcanite, it is preferable that metallic bushings 17 be provided to receive the thumb screws. In this form, the end of the opening 16 is also adapted to be sealed water tight when the clamp 7 is properly seated.

In operation, the supply of dental floss is inserted in the handle, one end thereof is threaded through the head portion 2 and is led over the dowel pin 8 on the thread arm 5 (see Fig. 2) and passes over the dowel pin on the opposite arm. It will be noted that the floss passes under the clamps and by tightening the clamp on the arm 5 the floss may be stretched taut and clamped in this condition by means of subsequently operating the clamp on the arm 6. The device is now threaded and ready for use. As the used portion of the floss becomes soiled it is only necessary to loosen the clamps, draw through a fresh supply of floss, tighten the clamps and cut off the soiled portion by means of the knife 10.

It will be noted that my invention comprises an implement that may be carried in the pocket of the user since the supply of thread is protected at all times.

Since my invention is capable, within the scope of the appended claims, of obvious modifications, it is to be understood that the specific form herein disclosed and described is to be considered as illustrative and not in a limiting sense.

Having thus described my invention, what I desire to claim is:—

1. A device of the character described including a hollow handle adapted to constitute a container for dental floss, a head portion adapted to be secured to said handle in such manner as to seal the handle, arms formed integral with said head portion and extending at substantially right angles therefrom, said head portion and an arm being provided with a canal leading from the outer end of said arm to the chamber within said hollow handle, and clamping means upon the end of said arm to securely hold the floss and to seal the end of the said canal.

2. In a dental floss holder in combination, means to hold a supply of dental floss, devices for clamping a portion of dental floss to permit said dental floss being forced between the teeth of the user, a smooth curved surface adjacent said devices, and a meniscus shaped cutting blade mounted upon said curved surface, said meniscus shaped cutting blade being set in a concave portion of said curved surface with its blade extending across the concavity so that the upper portion of said blade is convex and the said surface beneath said blade is concave thereby protecting the user from being cut by said blade.

3. A device of the class described including a body portion comprising a sealed container for dental floss, a head portion adapted to be connected to and seal said body portion, arms upon said head portion, and floss holding means on said arms; said head portion and one of said arms being provided with a tubular opening to lead the floss from within said body portion directly to the holding means on the said arm, the construction and arrangement of parts being such that the supply of dental floss together with the portion thereof leading to the said floss holding means on said arms is completely protected and sealed against contamination.

4. A device of the class described including, a substantially cylindrical hollow handle adapted to contain a supply of dental floss, a pair of cylindrical arms joined to said handle by smooth curved surfaces, one of said cylindrical arms being provided with a tubular opening leading directly from said hollow handle to the outer end of the said cylindrical arm, means to seal the end of said arm and clamp a thread of dental floss, and floss holding means on the outer end of the other arm, the construction and arrangement of parts being such as to completely seal and protect the entire supply of dental floss and to expose only the portion extending between said arms.

5. A device of the class described including a substantially cylindrical hollow handle adapted to contain a supply of dental floss, a pair of substantially cylindrical arms arranged at right angles to said handle and joined thereto by smooth curved surfaces, floss holding means on the outer end of said arms, one of said arms and a portion of said handle being provided with a tubular canal adapted to lead and protect the dental floss while being led from said hollow handle to a holding means carried by one of said arms, and a cutting blade located on a concave portion of one of said smooth surfaces in such manner that the operative portion of said blade is protected.

PAUL A. STUART.

Witnesses:
　WALLACE J. HILL,
　M. B. NICHOLS.